United States Patent

[11] 3,552,420

| [72] | Inventor | David M. Robertson |
| | | 45 Raith Gardens, Kirkcaldy, Fife, Scotland |
| [21] | Appl. No. | 704,020 |
| [22] | Filed | Feb. 8, 1968 |
| [45] | Patented | Jan. 5, 1971 |

[54] DEMAND REGULATOR
7 Claims, 7 Drawing Figs.

[52] U.S. Cl. ........................................................ 137/315, 251/347, 251/367
[51] Int. Cl. ...................................................... F16k 43/00, F16l 55/06
[50] Field of Search ............................................ 137/268, 315, 63RUXR(Digest), 316; 251/341, 347, 348, 367; 128/142.5, 142.2; 285/87

[56] References Cited
UNITED STATES PATENTS

| 1,345,124 | 6/1920 | Calhoun ....................... | 137/315 |
| 2,486,427 | 11/1949 | Miller et al. ................. | 137/268X |
| 2,521,310 | 9/1950 | Roth............................. | 137/268X |

*Primary Examiner*—William F. O'Dea
*Assistant Examiner*—David R. Matthews
*Attorney*—Townshend and Meserole

ABSTRACT: In a demand regulator for a gas breathing system replacement of a defective regulator by a spare regulator is facilitated by using a holder in which a housing for the regulator proper is detachably mounted. The holder has the inlet and outlet conduits secured to it, and the housing is positively latched in place.

INVENTOR
DAVID M. ROBERTSON
BY Townsend & Meserole
ATTORNEYS

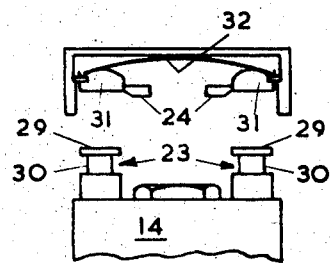
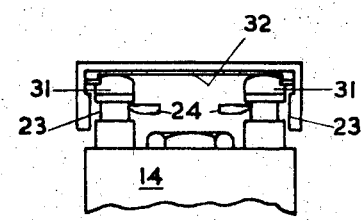
FIG.4         FIG.5
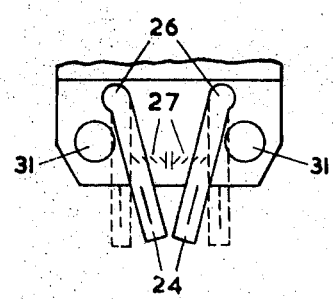
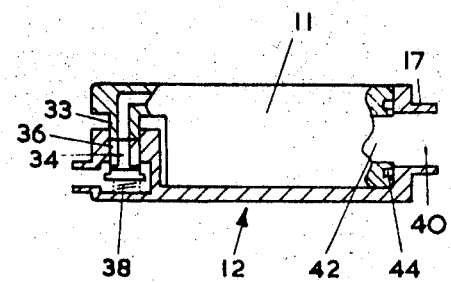
FIG.6         FIG.7
INVENTOR
DAVID M. ROBERTSON
BY Townsend & Meserole
ATTORNEYS

DEMAND REGULATOR

BACKGROUND OF THE INVENTION

1. Field of the Invention

This invention relates to a demand regulator for a system for supplying to a user a breathable gas from a source of gas under pressure. Such a system may be provided with a primary pressure-reducing valve, and with a demand regulator which passes breathable gas to the user only when the user inhales.

2. Description of the Prior Art

Existing demand regulators often house a spare regulator proper. When the original regulator becomes defective for any reason the gas flow is diverted to bypass the original regulator and flow through the spare one. This leads to a bulky, relatively complex construction.

SUMMARY OF THE INVENTION

The regulator unit of the present invention consists of a holder to which a detachable single regulator proper is latched. The gas conduits being connected to the holder, the only manipulation necessary to replace a defective regulator is to release the latch, remove the regulator, and position a replacement regulator in the holder with the latch engaged.

BRIEF DESCRIPTION OF THE DRAWINGS

The present invention will now be described by way of example with reference to the accompanying drawings, in which:

FIG. 4 is an end view of the inlet ends of the housing and holder, in an unlatched position;

FIG. 5 is a view similar to FIG. 4 but showing the ends latched together;

FIG. 6 is a scrap view of part of the hosing shown in FIG. 2, with a cover plate removed; and FIG. 7 is a diagrammatic sectional view of the housing and holder when latched together.

In FIGS. 1 and 7, a breathing regulator housing 11 is shown adjacent to a regulator holder 12. The holder 12 is in the form of a generally U-shaped cradle, with upstanding ends 13 and 14, connected by a web 16. To the end 14 is attached a flexible inlet hose 15 leading from the aircraft oxygen supply (not shown), an oxygen inlet valve 34 being contained within the end 14 and operated in a manner to be described.

The end 13 has mounted upon it a bayonet socket 17 to which may be fitted a breathing mask hose (not shown) having an appropriate bayonet coupling.

Figure 1:
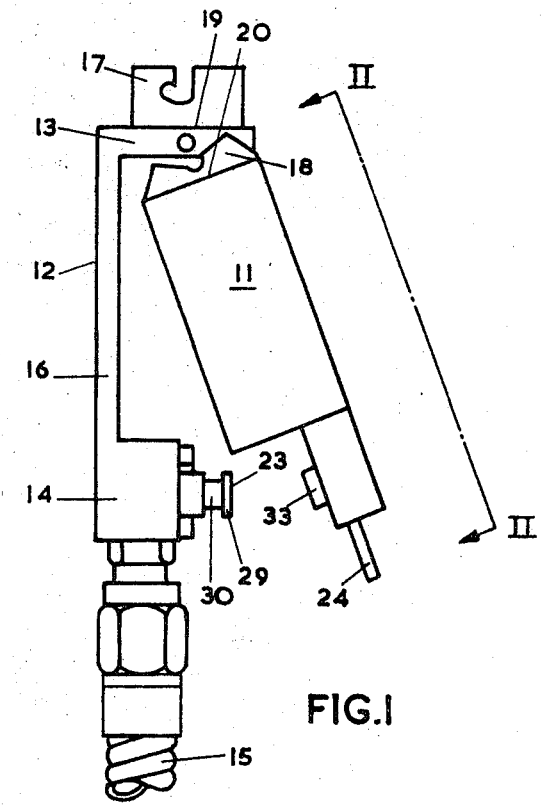
FIG. 1 is a side view of a regulator housing and holder for use in an aircraft and constructed in accordance with the invention.
Figure 2:
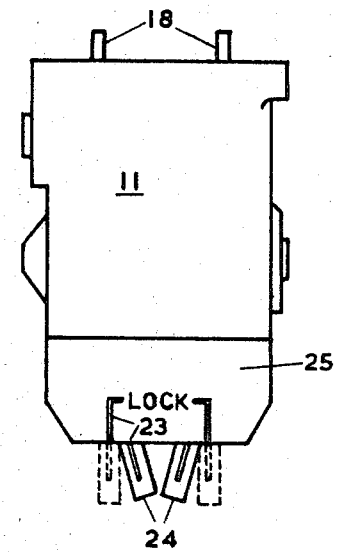
FIG. 2 is a front view i.e. looking in the direction II-II in FIG. 1, of the regulator housing.
Figure 3:
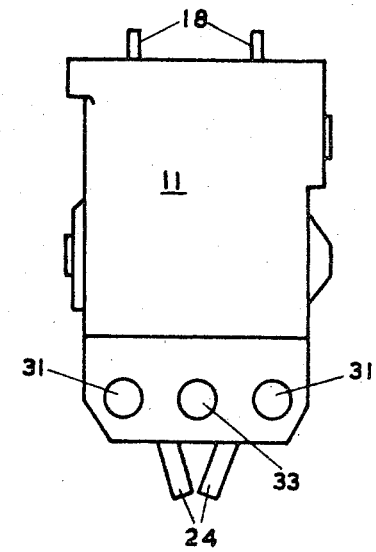
FIG. 3 is a back view of the housing shown in FIG. 2.

The regulator housing 11 is shown only in general outline in FIGS. 1, 2 and 3, as the precise details of its construction and operation form no part of the present invention. The housing 11 is detachably mountable in the holder 12.

That end of the housing 11 which is designed to engage with the end 13 of the holder 12 carries two short slotted hinge plates 18 adapted to embrace the upstanding end 13.

The end 13 has a pair of oppositely-directed short hinge pins 19 and each of the plates 18 on the housing 11 presents a slot 20 to one of the pins 19. Each slot 20 is semicircular in the center, with sloping sides leading down to the semicircular portion. It is thus possible readily to engage each pin 19 in the semicircular portion of a slot 20, with the housing 11 at an angle to the holder 12 approximately as shown in FIG. 1, and then to pivot the housing 11 clockwise as viewed in FIG. 1, to a limited extent about the hinge pins 19 until it is cradled in the holder 12.

The cooperation of the other end of the housing 11 with the end 14 of the holder 12 will now be described. As seen in FIGS. 1, 4 and 5, the end 14 has projecting therefrom a pair of posts 23, each having a broad head portion 29 mounted on a narrower neck portion 30. The cooperating end of the housing 11 has a pair of levers 24 projecting therefrom.

The visible parts of the levers 24, and a regulator cover 25 (FIG. 2) carry markings 28 which make the lever positions easily visible.

As shown in FIG. 6, in which the cover portion 25 has been removed, the levers are pivoted at 26 inside the housing, and are biassed away from each other by springs 27. The levers 24 are maintained in the inclined position shown in whole lines in FIGS. 2, 3, and 6, despite the outward pressure of the compression springs 27, by two stop members 31 (FIGS. 3—6) carried at the ends of a leaf spring 32 (shown only in FIGS. 4 and 5).

Between the two stop members 31 is located a projecting spigot 33 (FIGS. 1 and 3).

In operation, the pins 19 on the end 13 of the holder 12 are engaged in the semicircular slots 20 and the housing 11 is pivoted clockwise as viewed until it is cradled in the holder 12, as previously described. The aviator presses the housing 11 into the holder 12, thus engaging the two stop members 31 on the housing with the two posts 23 on the holder, and forcing the stop members 31 to move against the action of the leaf spring 32. Spring 32 could be replaced by independent compression springs acting on the stop members 31. The levers 24 are thus no longer restrained by the stop members 31 and slide down the heads 29 until they engage the neck portions 30 of the posts 23, as shown in FIG. 6, to latch the housing 11 to the holder. Only when the levers 24 are latched do they adopt the parallel position shown in dotted lines in FIGS. 2 and 4, in which the housing 11 is firmly latched in place in the holder 12.

The spigot 33 projecting from the housing enters an appropriately-shaped recess 36 in the end 14 of the holder 12 and opens the oxygen inlet valve 34 contained therein, permitting oxygen to flow from the aircraft supply to the housing 11. The valve 34 is biassed to the closed position by a spring 38, positioned internally of the holder 12.

The end 13 of the holder 12 has a passage 40 therein. The customary outlet 42 of the housing seals against a rubber seal 44 at the end of this passage, communicating with the breathing mask hose (not shown) coupled to the bayonet socket 17.

In order to remove the housing 11, whether to replace it by a spare regulator housing or for any other reason, it is only necessary to press the levers 24 together to their inclined position. This allows the leaf spring 32 to force the stop members 31 from the positions shown in FIG. 5 to those shown in FIG. 4. The housing 11 is thus no longer latched in place, and can be pivoted out from the holder on the hinge pins 19. In so doing the oxygen inlet valve 34 in the end 14 automatically closes.

Both the operations of inserting and removing the regulator housing can be carried out using only one hand. The markings 28 give a clear visible indication as to whether or not the housing is properly inserted and latched. Tactile indicia could be used if desired.

The holder 12 may be worn upon the clothing or lifejacket of the aviator. In this case it is convenient to provide a quick-disconnect coupling on the flexible hose 15, so that the aviator can leave his position in the aircraft without removing the holder.

By providing two independently movable levers, the possibility of accidental release of the housing by inadvertent movement of a single lever is avoided.

The levers, in the arrangement shown, are parallel only when the regulator housing is properly latched in place in the holder, so that no doubt exists as to whether the regulator housing is safely retained. This ambiguous indication is of particular value to a fully occupied aviator.

I claim:

1. A demand regulator for a gas breathing system, comprising a housing for the regulator proper having in it an inlet and an outlet for breathable gas, and a holder in the form of a cradle having inlet and outlet conduits secured to it, or integral with it, said cradle having two end members connected together by a web to define a recess into which the housing fits, said housing being adapted to pivot to a limited extent about one end member of the cradle and including at least one latch adapted to cooperate with the other end member to retain the housing in its operating position.

2. The regulator claimed in claim 1, in which the said one end member has a pair of pins projecting from it in opposite directions, and in which the respective end of the housing has a pair of slots in which the pins seat to form the pivotal connection between the holder and the housing.

3. The regulator claimed in claim 1, in which the housing has its inlet directed tangentially to the path it describes during said pivotal movement, and in which the inlet conduit in the respective end member of the holder terminates in a valve member which is biassed to an outer position in which it blocks the inlet conduit, and is movable, by engagement with the housing, against the bias to a position in which it opens the inlet conduit to place it in communication with the housing inlet.

4. The regulator claimed in claim 1, in which the said other end of the housing carries at least one pivoted lever spring biassed to a position in which it is in latching engagement with a detent surface forming part of the holder, the or each lever being manually movable against the bias to an unlatched position in which the lever is clear of the detent surface.

5. The regulator claimed in claim 4, in which there are two levers biassed apart from each other and movable towards each other to their unlatched position.

6. The regulator claimed in claim 4, in which the or each detent surface forms part of a post projecting outwardly from a surface of the holder and adapted to enter a recess in the housing.

7. The regulator claimed in claim 6, in which the or each post is adapted to displace a stop member inwardly of the recess, and in which the or each member is adapted to retain its associated latch lever in position to engage its respective post, and thereafter the detent surface, as the housing moves to its operating, latched position.